(12) United States Patent
Hall et al.

(10) Patent No.: US 11,173,766 B1
(45) Date of Patent: Nov. 16, 2021

(54) SUSPENSION SYSTEM WITH LOCKING STRUCTURE

(71) Applicants: Jonathan L. Hall, Emerald Hills, CA (US); Neal M. Lackritz, Mountain View, CA (US); Troy A. Carter, Sunnyvale, CA (US)

(72) Inventors: Jonathan L. Hall, Emerald Hills, CA (US); Neal M. Lackritz, Mountain View, CA (US); Troy A. Carter, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 16/106,056

(22) Filed: Aug. 21, 2018

Related U.S. Application Data

(60) Provisional application No. 62/555,108, filed on Sep. 7, 2017.

(51) Int. Cl.
*B60G 17/016* (2006.01)
*B60G 17/017* (2006.01)

(52) U.S. Cl.
CPC ....... *B60G 17/0164* (2013.01); *B60G 17/017* (2013.01); *B60G 2204/47* (2013.01); *B60G 2500/30* (2013.01)

(58) Field of Classification Search
CPC .............. B60G 17/0164; B60G 17/017; B60G 2204/47; B60G 2500/30
See application file for complete search history.

(56) References Cited

U.S. PATENT DOCUMENTS

| 2,757,938 A | 8/1956 | Crowder |
| 2,901,239 A | 8/1959 | Sethna |
| 2,913,252 A | 11/1959 | Norrie |
| 3,089,710 A | 5/1963 | Fiala |
| 3,236,334 A | 2/1966 | Wallerstein, Jr. |
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |

(Continued)

FOREIGN PATENT DOCUMENTS

| CN | 108215946 A | 6/2018 |
| CN | 208439009 U | 1/2019 |

(Continued)

OTHER PUBLICATIONS

Wikipedia, "Trailing-arm suspension", https://en.wikipedia.org/wiki/Trailing-arm_suspension, downloaded Sep. 3, 2019 (2 pp).

(Continued)

*Primary Examiner* — Behrang Badii
*Assistant Examiner* — Daniel L Greene
(74) *Attorney, Agent, or Firm* — Young Basile Hanlon & MacFarlane, P.C.

(57) ABSTRACT

A suspension component includes a suspension spring, a screw actuator that is operable to compress and decompress the suspension spring upon supply of electrical power to the screw actuator, and locking structure that engages a portion of the screw actuator to restrain motion of the screw actuator to maintain a current degree of compression of the suspension spring.

21 Claims, 12 Drawing Sheets

(56) References Cited

U.S. PATENT DOCUMENTS

| | | |
|---|---|---|
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,659,106 A | 4/1987 | Fujita et al. |
| 4,784,378 A | 11/1988 | Ford |
| 4,834,416 A | 5/1989 | Shimoe et al. |
| 4,893,832 A | 1/1990 | Booher |
| 4,922,159 A | 5/1990 | Phillips et al. |
| 4,960,290 A | 10/1990 | Bose |
| 4,981,309 A | 1/1991 | Froeschle et al. |
| 4,991,698 A | 2/1991 | Hanson |
| 5,033,028 A | 7/1991 | Browning |
| 5,060,959 A | 10/1991 | Davis et al. |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,645,250 A * | 7/1997 | Gevers .................. B64D 27/00 244/101 |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,170,838 B1 | 1/2001 | Laurent et al. |
| 6,233,510 B1 | 5/2001 | Platner et al. |
| 6,249,728 B1 | 6/2001 | Streiter |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Dix et al. |
| 6,637,561 B1 | 10/2003 | Collins et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,818,109 B2 | 10/2010 | Scully |
| 7,823,891 B2 | 11/2010 | Bushko et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,490,761 B2 | 7/2013 | Kondo |
| 8,499,903 B2 | 8/2013 | Sakuta et al. |
| 8,548,678 B2 | 10/2013 | Ummethala et al. |
| 8,579,311 B2 | 11/2013 | Butlin, Jr. et al. |
| 8,632,078 B2 | 1/2014 | Ehrlich et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,930,074 B1 | 1/2015 | Lin |
| 8,938,333 B2 | 1/2015 | Bose et al. |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,428,029 B2 | 8/2016 | Job |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,513,161 B2 | 12/2019 | Anderson et al. |
| 2001/0045719 A1 | 11/2001 | Smith |
| 2002/0190486 A1 | 12/2002 | Phillis et al. |
| 2003/0030241 A1 | 2/2003 | Lawson |
| 2003/0080526 A1 | 5/2003 | Conover |
| 2004/0054455 A1 | 3/2004 | Voight et al. |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |

(56) References Cited

U.S. PATENT DOCUMENTS

| | | |
|---|---|---|
| 2005/0206231 A1 | 9/2005 | Lu et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0164111 A1 | 7/2008 | Inoue et al. |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1* | 2/2010 | Hughes ............. B60G 21/007 280/5.509 |
| 2010/0059959 A1 | 3/2010 | Kim |
| 2010/0207344 A1 | 8/2010 | Nakamura |
| 2010/0222960 A1 | 9/2010 | Oida et al. |
| 2010/0252376 A1 | 10/2010 | Chern et al. |
| 2010/0253019 A1 | 10/2010 | Ogawa |
| 2011/0115183 A1 | 5/2011 | Alesso et al. |
| 2011/0277241 A1* | 11/2011 | Schejbal ............. A61G 7/0528 5/510 |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0253764 A1 | 9/2013 | Kikuchi et al. |
| 2013/0341143 A1 | 12/2013 | Brown |
| 2014/0005888 A1 | 1/2014 | Bose et al. |
| 2014/0145498 A1 | 5/2014 | Yamakado et al. |
| 2014/0156143 A1* | 6/2014 | Evangelou ......... B60G 17/0157 701/37 |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0123370 A1 | 5/2015 | Lee et al. |
| 2015/0197130 A1* | 7/2015 | Smith ................. B60G 17/0155 280/124.175 |
| 2015/0224845 A1 | 8/2015 | Anderson et al. |
| 2015/0231942 A1 | 8/2015 | Trangbaek et al. |
| 2015/0343876 A1 | 12/2015 | Yoshizawa et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1* | 11/2016 | Smith .................. B60G 17/017 |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0056748 A1 | 3/2018 | Grimes |
| 2018/0079272 A1 | 3/2018 | Aikin |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0297587 A1 | 10/2018 | Mahabadi et al. |
| 2018/0345747 A1 | 12/2018 | Boon et al. |
| 2018/0370314 A1 | 12/2018 | Higle |
| 2019/0023094 A1 | 1/2019 | Panagis et al. |
| 2019/0118604 A1 | 4/2019 | Suplin et al. |
| 2019/0248203 A1* | 8/2019 | Krehmer ............ B60G 17/0157 |
| 2019/0308484 A1 | 10/2019 | Belter et al. |
| 2020/0088214 A1 | 3/2020 | Woodard et al. |
| 2020/0171907 A1* | 6/2020 | Hall ................... B60G 17/0155 |
| 2020/0180386 A1 | 6/2020 | Tabata et al. |
| 2020/0216128 A1 | 7/2020 | Doerksen |
| 2021/0061046 A1 | 3/2021 | Simon et al. |

FOREIGN PATENT DOCUMENTS

| | | |
|---|---|---|
| DE | 19853876 A1 | 5/2000 |
| DE | 19850169 C1 | 7/2000 |
| DE | 102009060213 A1 | 6/2011 |
| DE | 102010041404 A1 | 3/2012 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| EP | 1693233 B1 | 4/2009 |
| EP | 2072855 A1 | 6/2009 |
| EP | 2233330 B1 | 2/2013 |
| EP | 3088230 A1 | 11/2016 |
| GB | 2220625 A | 1/1990 |
| GB | 2437633 A | 10/2007 |
| JP | 2004155230 A | 6/2004 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 101509600 B1 | 4/2015 |
| KR | 20170095073 A | 8/2017 |
| WO | 9304883 A1 | 3/1993 |
| WO | 2011148792 A1 | 12/2011 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |

(56) References Cited

FOREIGN PATENT DOCUMENTS

| WO | 2016120044 A1 | 8/2016 |
|---|---|---|
| WO | 2017055151 A1 | 4/2017 |

OTHER PUBLICATIONS daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Monroe Intelligent Suspension, "CVSA2/KINETIC: Low Energy For High Performance", www.monroeintelligentsuspension.com/products/cvsa2-kinetic/, Date Unknown, Downloaded Mar. 2, 2017, 2 pp.

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

\* cited by examiner

SUSPENSION SYSTEM WITH LOCKING STRUCTURE

CROSS-REFERENCE TO RELATED APPLICATIONS

This application claims the benefit of U.S. Provisional Application No. 62/555,108, filed on Sep. 7, 2017, the content of which is hereby incorporated by reference in its entirety for all purposes.

TECHNICAL FIELD

This disclosure relates to vehicles and, in particular, suspension systems thereof.

BACKGROUND

Active suspension actuators can change the ride height of a vehicle. By continuous operation of the active suspension actuator, a particular height can be maintained.

SUMMARY

One aspect of the disclosed embodiments is a suspension component that includes a suspension spring, a screw actuator that is operable to compress and decompress the suspension spring upon supply of electrical power to the screw actuator, and locking structure that engages a portion of the screw actuator to restrain motion of the screw actuator to maintain a current degree of compression of the suspension spring.

In some implementations, the screw actuator includes a rotatable component, and the locking structure restrains motion of the screw actuator by engagement with the rotatable component. In one example, the locking structure includes a pin that is engageable with a recess formed on the rotatable component. In another example, the locking structure includes a pawl that is engageable with a feature formed on the rotatable component. In another example, the locking structure includes a restraining collar that is engageable with features that are formed on an outer surface of the rotatable component. In another example, the locking structure includes a restraining plate that has recesses that are engageable with features formed on an axial end of the rotatable component.

In some implementations, the rotatable component is a rotor of the screw actuator. In some implementations, the screw actuator includes a shaft and a nut, wherein the rotatable component is the nut. In some implementations, the screw actuator is a ball screw actuator. In some implementations, the screw actuator is a lead screw actuator.

The locking structure may be operable to maintain the current degree of compression of the suspension spring when supply of electrical power to the screw actuator is discontinued.

In some implementations, the suspension component includes a top mount, a bottom mount, a housing connected to the top mount, a spring mount connected to the housing, and a suspension spring that extends from the spring mount to the bottom mount, wherein the screw actuator includes a rotor, a stator that is operable to rotate the stator as a result of electromagnetic interaction between the stator and the rotor, a shaft that is connected to the bottom mount, and a nut that is connected to the rotor and engages the shaft to linearly translate the shaft in response to rotation of the ball nut.

Another aspect of the disclosed embodiments is a suspension component that includes a suspension spring, a linear output actuator that is operable to compress and decompress the suspension spring upon supply of electrical power to the linear output actuator, and a locking structure that engages a portion of the linear output actuator to restrain motion of the linear output actuator to maintain a current degree of compression of the suspension spring.

In some implementations, the linear output actuator includes a translatable shaft, and the locking structure restrains motion of the linear output actuator by engagement with the translatable shaft. In one example, the locking structure includes a clamp. In one example, the locking structure is operable to maintain the current degree of compression of the suspension spring when supply of electrical power to the linear output actuator is discontinued.

In some implementations, the suspension component includes a top mount, a bottom mount, a housing connected to the top mount, a spring mount connected to the housing, and a suspension spring that extends from the spring mount to the bottom mount, wherein the linear output actuator includes a shaft that is connected to the bottom mount to move the bottom mount relative to the top mount in response to translation of the shaft by the linear output actuator.

Another aspect of the disclosed embodiments is a method for operating a vehicle. The method includes detecting a planned stop; moving the vehicle from a raised position to a lowered position while the vehicle is in motion; stopping the vehicle; resuming motion of the vehicle; and moving the vehicle from the lowered position to the raised position subsequent to resuming motion of the vehicle.

In some implementations, moving the vehicle from the raised position to the lowered position and from the lowered position to the raised position is performed using suspension components. In some implementations, the suspension components each include a first load path having a passive suspension component, a second load path having an active suspension component, and a locking structure for maintaining compression of the passive suspension component while the vehicle is stopped.

DETAILED DESCRIPTION

In an active suspension system that utilizes an actuator and a spring, certain control operations contemplate compressing the spring using the actuator for an extended period of time. One example of such an operation arises when lowering the vehicle using the actuator for the purpose of passenger ingress or egress. Prolonged compression of the spring by the actuator may not be feasible due to power usage by the actuator and due to heat generation by the actuator. Disclosed herein are active suspension components that include locking structures that maintain compression of a spring while the actuator is no longer drawing power.

Figure 1:
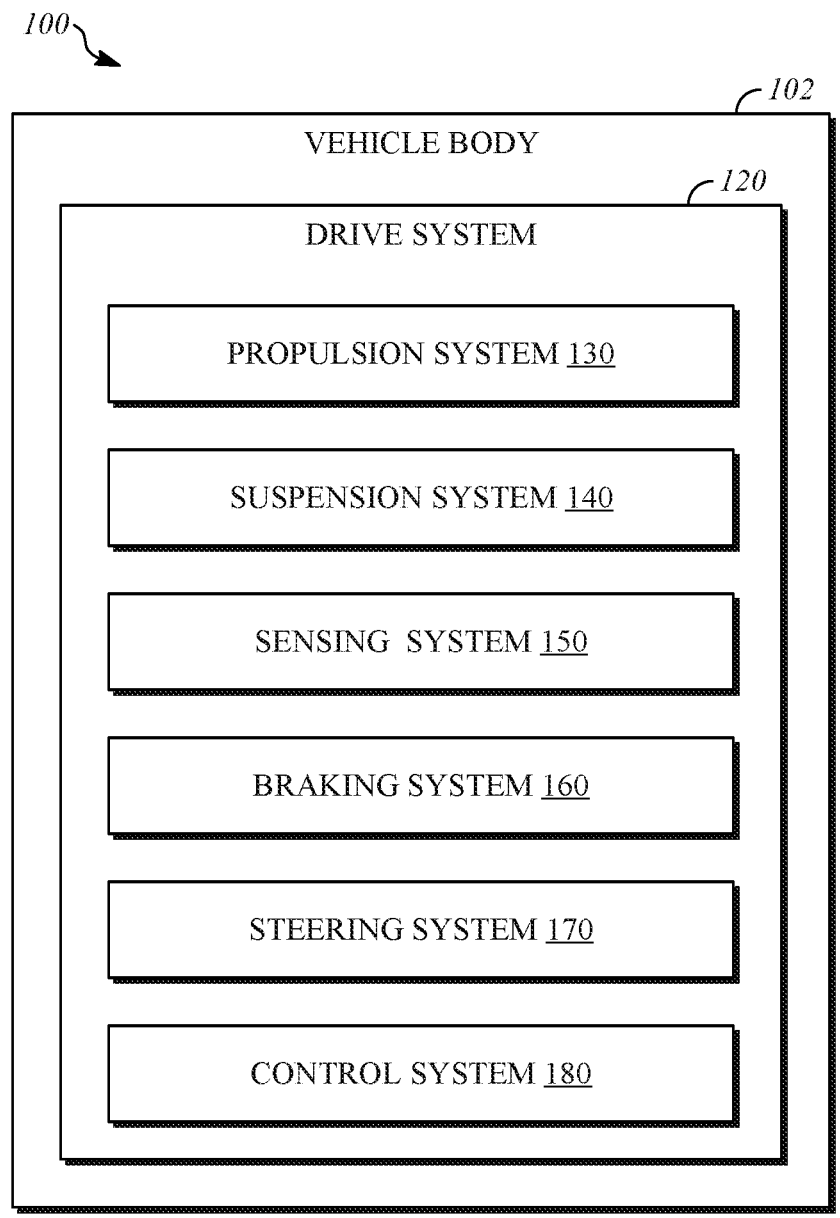
FIG. 1 is a block diagram showing a vehicle according to an example.

FIG. 1 is a block diagram that shows a vehicle 100 and functional subsystems thereof, including a suspension system 160. The suspension system 160 is an active suspension system that is configured to control generally vertical motion of the wheels with a linear actuator that can apply upward and downward force to introduce energy into and absorb energy from the wheels.

The vehicle 100 generally includes a vehicle body 102 and a drive system 120 connected to the vehicle body 102. The vehicle body 102 may, for example, include or define a passenger compartment for carrying passengers. The drive system 120 is configured to move the vehicle 100, including the passenger compartment. The drive system 120 includes various functional subsystems, including a propulsion system 130 (i.e., for propelling the vehicle 100), a braking system 140 (i.e., for slowing the vehicle 100), a steering system 150 (i.e., for directing the vehicle 100 in different directions), a suspension system 160 (i.e., for supporting the vehicle 100), a sensing system 170 (i.e., for sensing various aspects of the vehicle 100, including the various subsystems and the external environment), and a control system 180 (i.e., for controlling the various other subsystems individually or in a coordinated manner). The drive system 120 may be an autonomous drive system that operates the various functional subsystems to move the vehicle 100 to a user-selected location without further input from the user.

Figure 2:
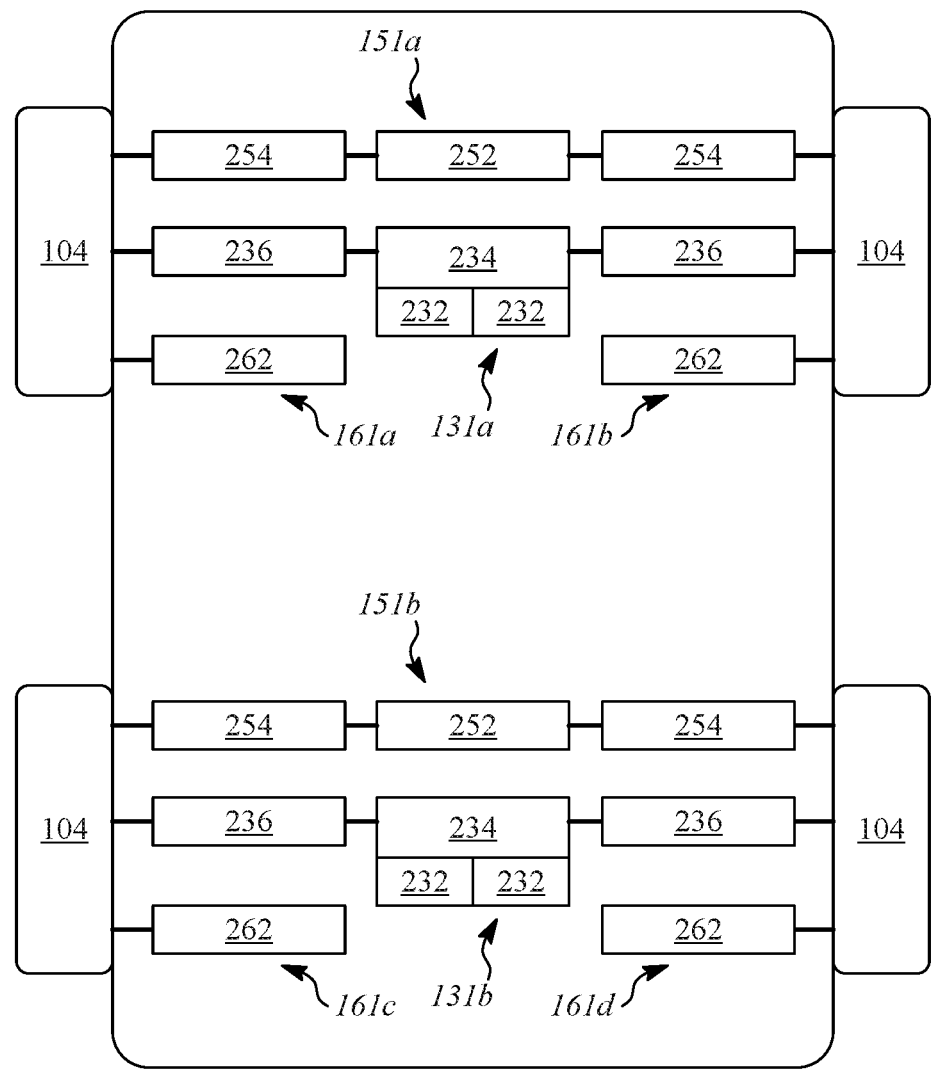
FIG. 2 is a schematic view of the vehicle of FIG. 1.

Referring to FIG. 2, the vehicle 100 includes wheels 104 (e.g., four) that are coupled to and support the vehicle body 102 (e.g., while travelling on a public roadway). The wheels 104 may be coupled to the vehicle body 102, for example, with the propulsion system 130, the steering system 150, and the suspension system 160. The wheels 104 may include tires, such that each wheel 104 may be considered a subassembly of a wheel rim and a tire.

The propulsion system 130 generally includes one or more motors 232, one or more gearboxes 234, and drive shafts 236 (e.g., half-shafts) operatively connecting each wheel 104 to one of the gearboxes 234. Broadly speaking, the motors 232 provide torque to the gearboxes 234, the gearboxes 234 alter the output torque (e.g., increase) and output speed (e.g., decrease) of the motors 232, and the drive shafts 236 transfer torque from the gearboxes 234 to the wheels 104. The motors 232 may provide positive torque for propelling the vehicle 100 in a forward direction and for decelerating the vehicle 100 when moving in a rearward direction, and may provide negative torque for propelling the vehicle 100 in a rearward direction and for deceleration the vehicle 100 when moving in a forward direction. The motors 232 may also function as generator, when receiving torque from the wheels 104, and function to recharge a battery (not shown) or other energy storage system of the vehicle 100. As shown, the propulsion system 130 may include a front propulsion system 131a and a rear propulsion system 131b that each include two motors 232 coupled to a gearbox 234 (e.g., a single gearbox) and associated with one drive shaft 236 and the one wheel 104 coupled thereto. Variations of the propulsion system 130 are contemplated, which may include a different number of driven wheels (e.g., only front or rear wheels being driven), a different number of the motors 232 associated with the wheels 104 (e.g., one motor associated with two wheels 104), and a different number of gearboxes 234 associated with the wheels 104 (e.g., one gearbox for each wheel 104).

The braking system 140 generally provides deceleration torque via friction for decelerating the vehicle 100 when moving in the forward direction and/or when moving in the rearward direction.

The steering system 150 generally includes one or more steering actuators 252 and steering linkages 254 operatively coupling each wheel 104 to one of the steering actuators 252. Broadly speaking, the steering system 150 controls the pivoted position of the wheels 104 about generally vertical axes. The steering actuators 252 move the steering linkages 254 in inboard and outboard directions relative to the vehicle body 102 to, thereby, pivot the wheels 104 about the vertical axes. As shown, the steering system 150 may include a front steering system 151a and a rear steering system 151b that each include one steering actuator 252 that is associated with two steering linkages 254 and the wheels 104 coupled thereto. Variations of the steering system 150 are contemplated, which may include a different number of steering actuators 252 associated with the wheels 104 (e.g., one steering actuator for each wheel 104).

The suspension system 160 is an active suspension system in which the suspension components 262 transfer energy into and absorb energy from the wheels 104 with upward and downward movement relative to the vehicle body 102. Broadly speaking, the suspension system 160 controls vertical motion of the wheels 104 relative to the vehicle body 102, for example, to ensure contact between the wheels 104 and a surface of the roadway and to limit the influence of roadway conditions on undesirable movements of the vehicle body 102. As shown, the suspension system 160 may include a front left suspension system 161a, a front right suspension system 161b, a rear left suspension system 161c, and a rear right suspension system 161d, each of which includes a suspension component 262 that is associated with one of the wheels 104. Mechanical components of the suspension system 160, including the suspension component 262 and other components discussed below, may be considered an assembly (e.g., a suspension assembly). Further details of the suspension system 160 are discussed in further detail below.

The sensing system 170 includes sensors for observing external conditions of the vehicle 100 (e.g., location of the roadway and other objects) and conditions of the vehicle 100 (e.g., acceleration and conditions of the various subsystems and their components). The sensing system 170 may include sensors of various types, including dedicated sensors and/or functional components of the various subsystems (e.g., actuators may incorporate sensors or portions of actuators may function as sensors such as by measuring current draw of an electric motor incorporated in an actuator).

The control system 180 includes communication systems and components (i.e., for receiving sensor signals and sending control signals) and processing components (i.e., for processing the sensor signals and determining control operations), such as a controller. The control system 180 may include various control subsystems, for example, associated with (or as part) of one or more of the various other subsystems described herein (e.g., the propulsion system 130, the braking system 140, etc.).

Figure 3A:
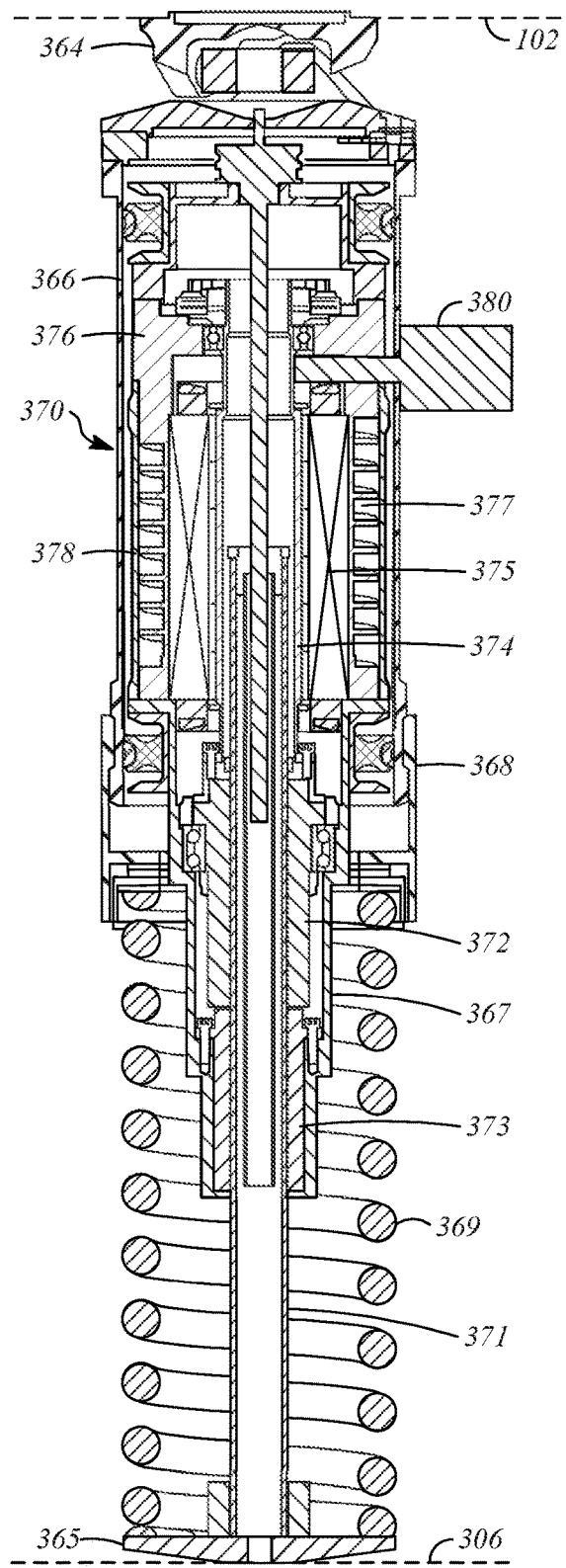
FIG. 3A is a cross-sectional view of the suspension component at a first length.
Figure 3B:
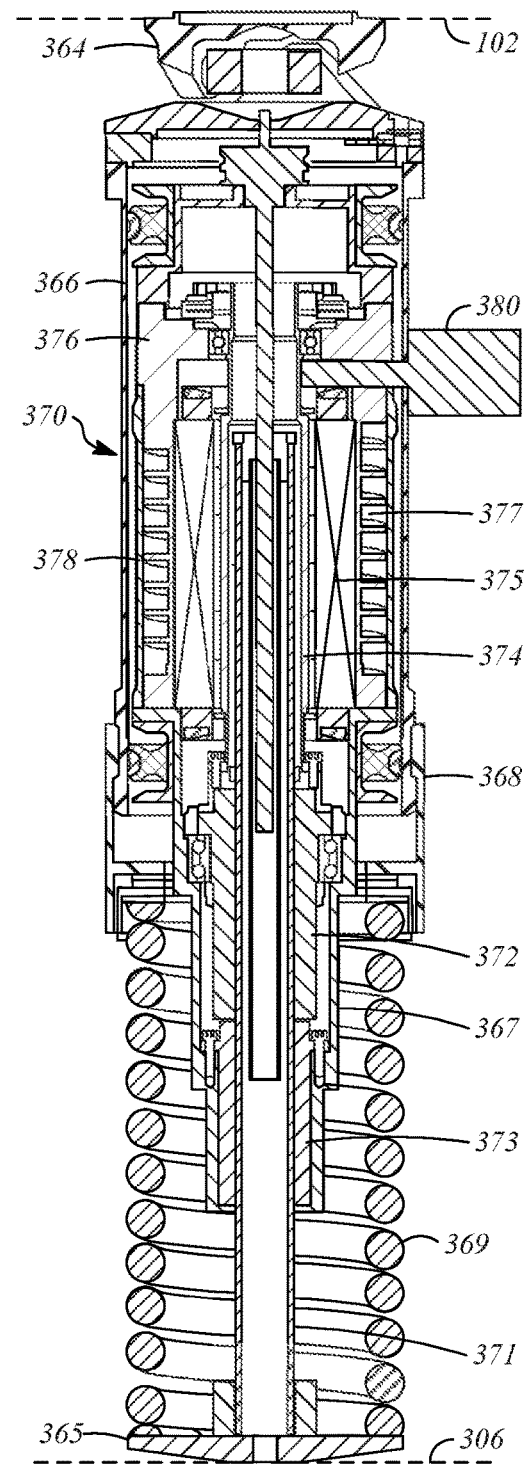
FIG. 3B is a cross-sectional view of the suspension component at a second length.
Figure 4A:
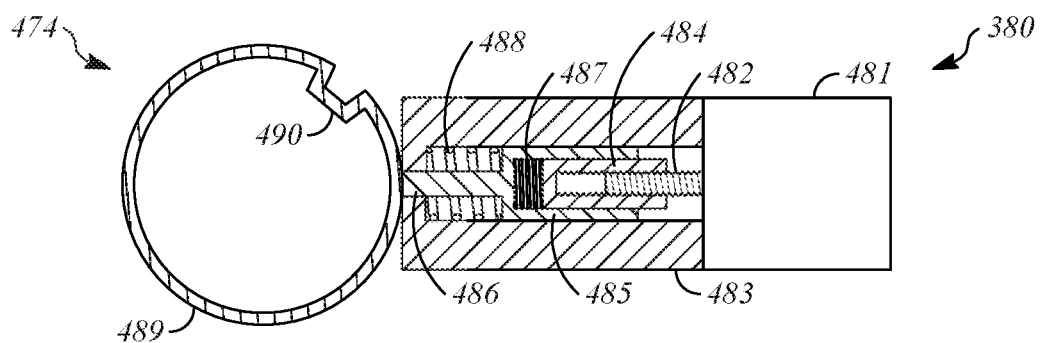
FIG. 4A is a schematic illustration showing a first example of a locking structure in a pre-engaged position relative to a rotational component.
Figure 4B:
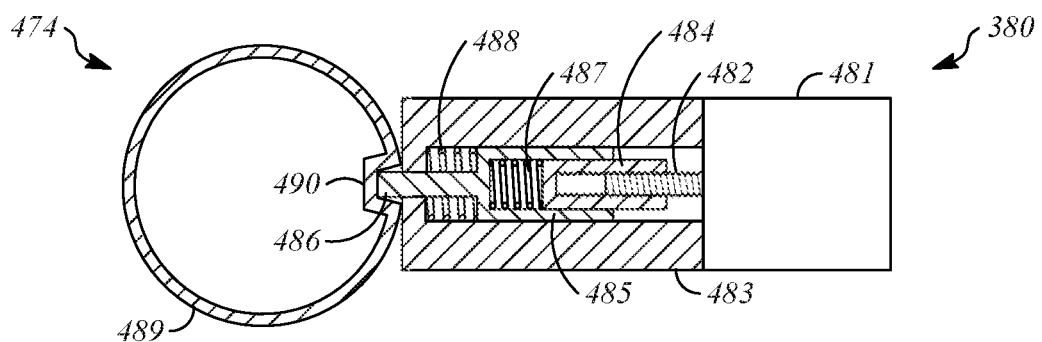
FIG. 4B is a schematic illustration showing the locking structure of FIG. 4A in an engaged position relative to the rotational component.
Figure 4C:
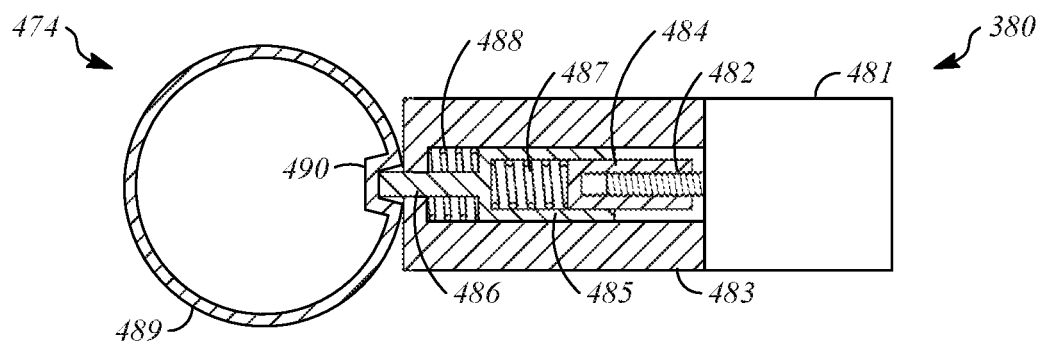
FIG. 4C is a schematic illustration showing the locking structure of FIG. 4A in a disengaged position relative to the rotational component.
Figure 4D:
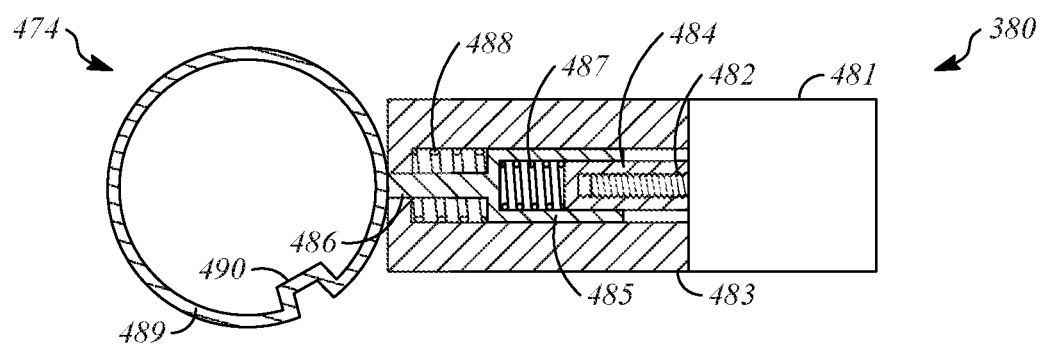
FIG. 4D is a schematic illustration showing the locking structure of FIG. 4A in a released position relative to the rotational component.

FIG. 3A is a cross-sectional view of the suspension component 262 at a first length, and FIG. 3B is a cross-sectional view of the suspension component 262 at a second length. The second length is shorter than the first length owing to a greater degree of compression of portions of the suspension component 262, as will be explained herein.

An upper end of the suspension component 262 is connected to the vehicle body 102 and a lower end of the suspension component 262 is connected to an unsprung component 306 that supports the wheel 104. The unsprung component 306 moves upward and downward relative to the vehicle body 102 and may, for example, be a steering knuckle or a suspension control arm. The suspension component 262 defines a first load path between the vehicle body 102 and the unsprung component 306 through a passive suspension component, such as a spring. The suspension component 262 also defines a second load path between the vehicle body 102 and the unsprung component 306 through an active suspension component, such as a linear actuator, which in the illustrated example includes a screw actuator as will be described further herein.

The first and second load paths cooperatively function to transfer force axially between the unsprung component 306 and the vehicle body 102. The first load carries a gravity preload of the vehicle 100 (i.e., load due to gravity irrespective of any dynamic loading) along with a portion of a dynamic load between the vehicle body 102 and the unsprung component 306. The second load path carries another portion of the dynamic load between the vehicle body 102 and the unsprung component 306 and, as compared to the first load path, provides primary damping functions of the suspension system 160.

The suspension component 262 includes a top mount 364, a bottom mount 365, an upper housing portion 366, a lower housing portion 367, a spring mount 368, suspension spring such as a coil spring 369, a screw actuator such as ball screw actuator 370, and a locking structure 380. The ball screw actuator 370 includes a shaft 371, a ball nut 372, a ball spline housing 373, a rotor 374, a stator 375, a stator housing 376, cooling passages 377, and a cooling jacket 378. The first load path includes at least the coil spring 369 or other type of suspension spring (e.g., air springs, torsion bars, etc.), and in the illustrated example also includes the top mount 364, the bottom mount 365, the upper housing portion 366, and the spring mount 368. The second load path includes at least the ball screw actuator 370 or other screw actuator (e.g., lead screw, roller screw, etc.), and in the illustrated example also includes the top mount 364, the bottom mount 365, and the upper housing portion 366. Additional components may be included in the suspension component 262, such as vibration isolators (e.g., dampers, bushings, etc.), position sensors, and load sensors.

The top mount 364 is coupled to an upper end of the upper housing portion 366 and the vehicle body 102 to transfer forces to the vehicle body 102. The bottom mount 365 is separately coupled to lower ends of the coil spring 369 and the shaft 371 of the ball screw actuator 370 to transfer force to the unsprung component 306. The spring mount 368 is connected to a lower end of the upper housing portion 366, with the coil spring 369 being engaged and retained by the spring mount 368, for example, by disposition of an upper end of the coil spring 369 in an annular channel defined by the spring mount 368, such that the spring mount 368 extends between the spring mount 368 and the lower housing portion 367.

The ball screw actuator 370 is disposed within the upper housing portion 366 and the lower housing portion 367. The rotor 374 is a rotatable component in the form of a hollow, tubular structure that extends along a longitudinal axis of the upper housing portion 366. The stator 375 is arranged around and radially outward from the rotor 374. Using any suitable motor-generator configuration, the rotor 374 and the stator 375 are configured such that electromagnetic interaction of the rotor 374 and the stator 375 causes rotation of the rotor 374 when the stator 375 is energized (e.g., by selective energization of stator coils that are included in the stator 375.

The stator 375 may be disposed in the stator housing 376. In addition to providing structural support for the stator 375, the stator housing 376 absorbs heat generated by the stator 375 when it is energized. Cooling passages 377 are defined on an outside periphery of the stator housing 376. The suspension component 262 may be connected to a source of cooling media (e.g., liquid at a lower temperature than the stator housing 376) for circulating the cooling media through the cooling passages 377. The cooling media is retained in the cooling passages 377 by the cooling jacket 378, which is connected to the exterior of the stator housing 376.

The ball nut 372 is a rotatable component of the ball screw actuator 370. The ball nut 372 is connected to the rotor 374 and is rotated in unison with the rotor 374. As the ball nut 372 is rotated by the rotor 374, the ball nut 372 engages the shaft 371 through engagement of recirculating ball bearings that are disposed in the ball nut 372 with a helical groove that is formed on at least part of the shaft 371, which causes the shaft 371 to translate axially relative to the upper housing portion 366 in response to rotation of the ball nut 372. Thus, the shaft 371 is a translatable shaft, since it is able to translate linearly relative to portions of the suspension component 263, including the upper housing portion 366.

The ball spline housing 373 is also engaged with the shaft 371, but functions as a linear bearing that resists rotation, to restrain the shaft 371 from rotating as a result of rotation of the ball nut 372 relative to the shaft 371. The ball spline housing 373 includes recirculating balls that engage axial grooves (i.e., splines) that are formed on at least a portion of the shaft 371.

The shaft 371 extends through an aperture that is defined by the lower housing portion 367. A lower end of the shaft 371 is connected to the bottom mount 365 to allow the ball screw actuator 370 to apply force to the bottom mount 365.

The locking structure 380 is configured to engage a portion of the ball screw actuator 370 to restrain motion of the ball screw actuator 370. Restraining the motion of the ball screw actuator 370 fixes the translational position of the shaft 371 to maintain a current degree of compression of the coil spring 369 when supply of electrical power to the ball screw actuator 370 is discontinued. As one example, the locking structure 380 may be configured to restrain motion of the ball screw actuator 370 by engagement with a rotatable component, such as the rotor 374 or the ball nut 372 of the ball screw actuator 370. By engagement with a rotatable component, the shaft 371 cannot back drive the ball screw actuator 370 because translation of the shaft 371 will be resisted by the ball nut 372 (which will not rotate when rotatable components of the ball screw actuator 370 are locked against rotation). As another example, the locking structure 380 may be configured to restrain motion of the ball screw actuator 370 by engagement with a translational component, such as the shaft 371, such as by clamping the shaft 371. In implementations where motion of a translational component is restrained, the ball screw actuator 370 may be replaced with a linear output actuator, such as a direct drive linear motor. Examples of restraining motion of rotational and translational components of the ball screw actuator 370 will be described further herein.

FIGS. 4A-4D are schematic illustrations showing the locking structure 380 in a pre-engaged position (FIG. 4A), an engaged position (FIG. 4B), a disengaged position (FIG. 4C), and a released position (FIG. 4D) relative to a rotational component 474. As an example, the rotational component 474 may be the rotor 374 of the ball screw actuator 370. Alternatively, the rotational component could be the ball nut 372 of the ball screw actuator 370. The locking structure 380 has a motor 481, a lead screw 482, a housing 483, a pin having an inner pin part 484 and an outer pin part 485, an end portion 486 of the outer pin part 485, a first spring 487, and a second spring 488. The rotational component 474 has an outer surface 489 (i.e., a peripheral surface) and a recess 490 that is formed on the outer surface 489.

The motor 481 is an electric motor operated by a signal (e.g., supply of electrical power) and is connected to the lead screw 482 for rotating the lead screw 482 in first and second rotational directions that correspond to advancing and retracting the pin. The motor 481 can be fixed to the housing 483, which contains the inner pin part 484 the outer pin part 485, the first spring 487, and the second spring 488.

The lead screw 482 is threaded to the inner pin part 484, and the inner pin part 484 is disposed in an internal cavity of the outer pin part 485. The first spring 487 is positioned in the internal cavity to urge the outer pin part 485 away from the inner pin part 484 and toward engagement with the rotational component 474, which pre-loads the end portion 486 of the outer pin part 485 relative to the outer surface 489 of the rotational component 474 when the recess 490 is not aligned with the end portion 486 of the outer pin part 485, as in the pre-engaged position of FIG. 4A.

During rotation of the rotational component 474, the recess 490 comes into alignment with the end portion 486 of the outer pin part 485. Biased outward by the first spring 487 (and overcoming the force applied to the outer pin part 485 by the second spring 488), the end portion 486 moves outward into the recess 490 to define the engaged position of FIG. 4B, in which rotation of the rotational component 474 is restrained by engagement of the end portion 486 of the outer pin part 485 with the recess 490 of the rotational component 474.

To allow rotation of the rotational component 474, the motor 481 is operated to retract the inner pin part 484 relative to the outer pin part 485, which decompresses the first spring 487. At this point, the end portion 486 of the outer pin part 485 remains in the recess 490 of the rotational component 474, as shown in the disengaged position of FIG. 4C. However, the force applied to the rotational component 474 by the end portion 486 of the outer pin part 485 is small relative to the forces applied in the pre-engaged position of FIG. 4A and the engaged position of FIG. 4B, allowing rotation of the rotational component 474 to cause retraction of the end portion 486 of the outer pin part 485 from the recess 490, such as by interaction of portions of the recess 490 (e.g., tapered surfaces) with the end portion 486 of the outer pin part 485. Further retraction of the inner pin part 484 by rotation of the lead screw 482 causes the force applied by the first spring 487 to diminish until it is overcome by the force applied by the second spring 488, to bias the end portion 486 of the outer pin part 485 away from the recess 490 of the rotational component 474, as shown by the released position of FIG. 4D.

Figure 5A:
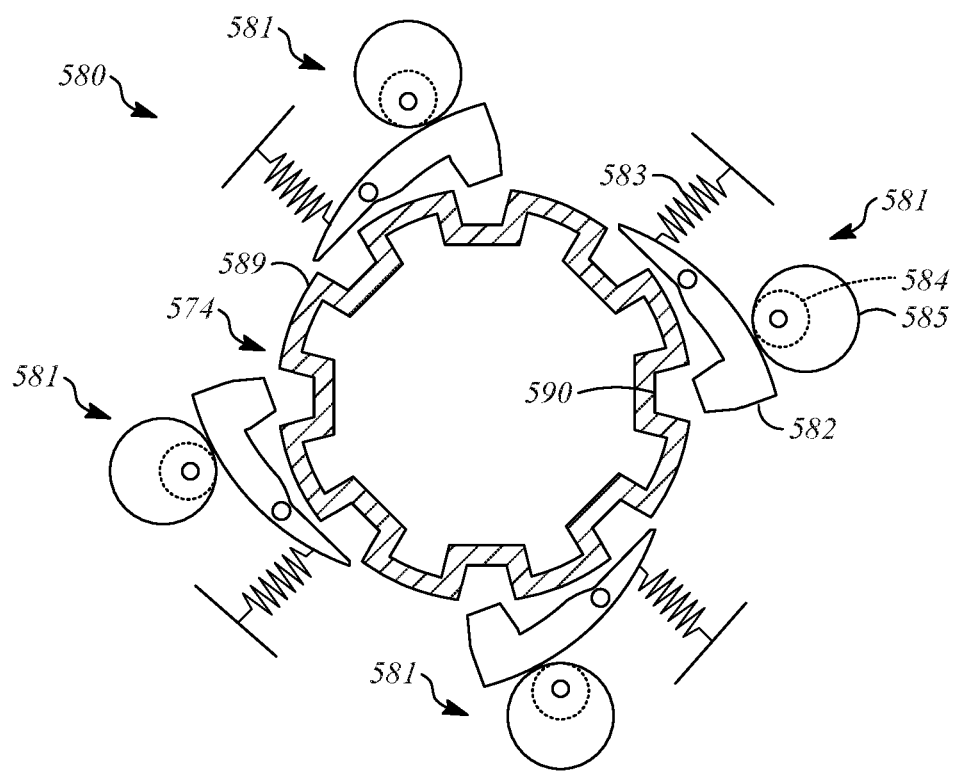
FIG. 5A is a schematic illustration showing a second example of a locking structure in a disengaged position relative to a rotational component.
Figure 5B:
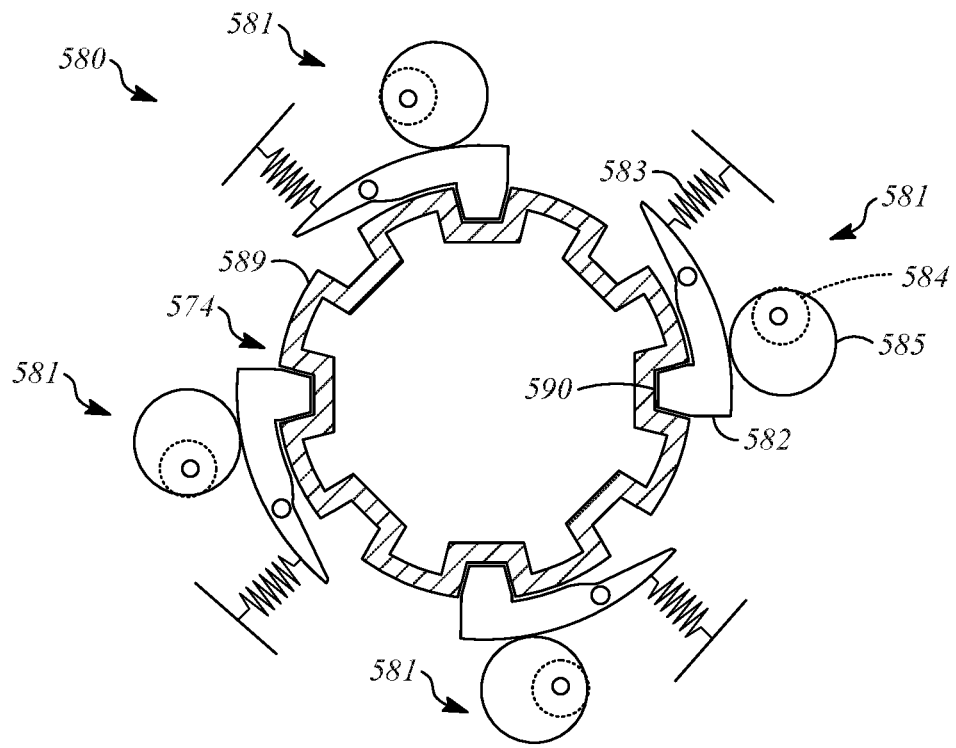
FIG. 5B is a schematic illustration showing the locking structure of FIG. 5A in an engaged position relative to the rotational component.

FIGS. 5A-5B are schematic illustrations showing a locking structure 580 in a disengaged position (FIG. 5A), and an engaged position (FIG. 5B) relative to a rotational component 574. As an example, the rotational component 574 may be the rotor 374 of the ball screw actuator 370. Alternatively, the rotational component may be the ball nut 372 of the ball screw actuator 370. The locking structure 580 includes one or more pawl assemblies 581 that each have a pawl 582 that is pivotally movable into and out of engagement with the rotational component, a spring 583 that biases the pawl away from engagement with the rotational component 574, a rotary actuator 584 (e.g., an electric motor), and a cam 585 that is eccentrically mounted relative to the rotary actuator 584 to drive the pawl 582 between engaged and disengaged position. In the disengaged position, as in FIG. 5A, the pawl 582 is not engaged with the rotational component 574. In the engaged position, as in FIG. 5B, the pawl 582 is engaged with a feature that is formed on the rotational component 574, such as a recess 590 that is formed on an outer surface 589 of the rotational component 574, to restrain rotation of the rotational component 574.

Figure 6A:
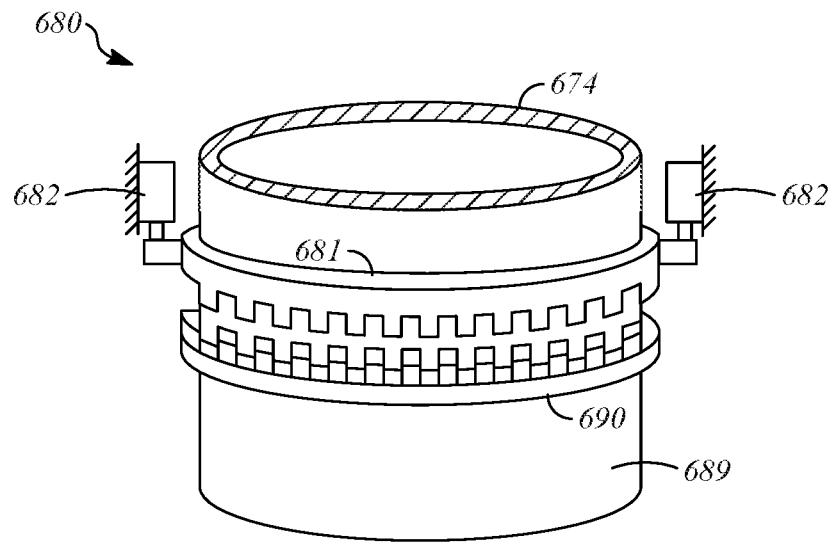
FIG. 6A is a schematic illustration showing a third example of a locking structure in a disengaged position relative to a rotational component.
Figure 6B:
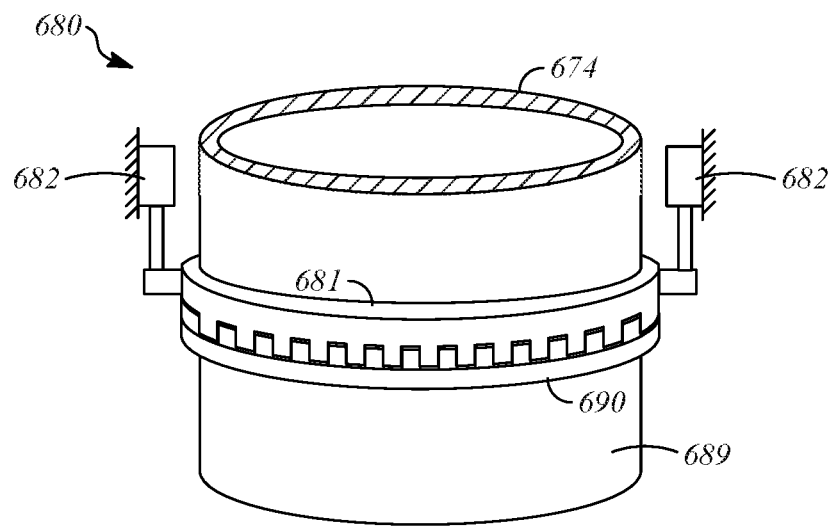
FIG. 6B is a schematic illustration showing the locking structure of FIG. 6A in an engaged position relative to the rotational component.

FIGS. 6A-6B are schematic illustrations showing a locking structure 680 in a disengaged position (FIG. 6A), and an engaged position (FIG. 6B) relative to a rotational component 674. As an example, the rotational component 674 may be the rotor 374 of the ball screw actuator 370. Alternatively, the rotational component may be the ball nut 372 of the ball screw actuator 370. The locking structure 680 includes a restraining collar 681 that is engageable with features 690 that are formed on an outer surface 689 of the rotational component 674, and may extend radially outward from a nominal surface contour of the outer surface 689 of the rotational component 674. Engagement of the restraining collar 681 with the features 690 is operable to restrain rotation of the rotational component 674.

In the illustrated example the restraining collar 681 and the features 690 include sets of complementary engaging structures in the form of teeth that are configured to engage and disengage by axial movement of the restraining collar 681. The restraining collar 681 is moved by one or more actuators, such as linear actuators 682 in the illustrated example, or other types of actuators such as rotary actuators, hydraulic actuators, or pneumatic actuators. The restraining collar 681 is fixed against rotation relative non-moving components of the suspension component 262, such as the upper housing portion 366. In the disengaged position, as in FIG. 6A, the restraining collar 681 is not engaged with the rotational component 674, and the rotational component 674 may rotate relative to the restraining collar 681. In the engaged position, as in FIG. 6B, the linear actuators 682 have translated the restraining collar 681 relative to the rotational component 674 and into engagement with the features 690 to restrain rotation of the rotational component 674.

Figure 7A:
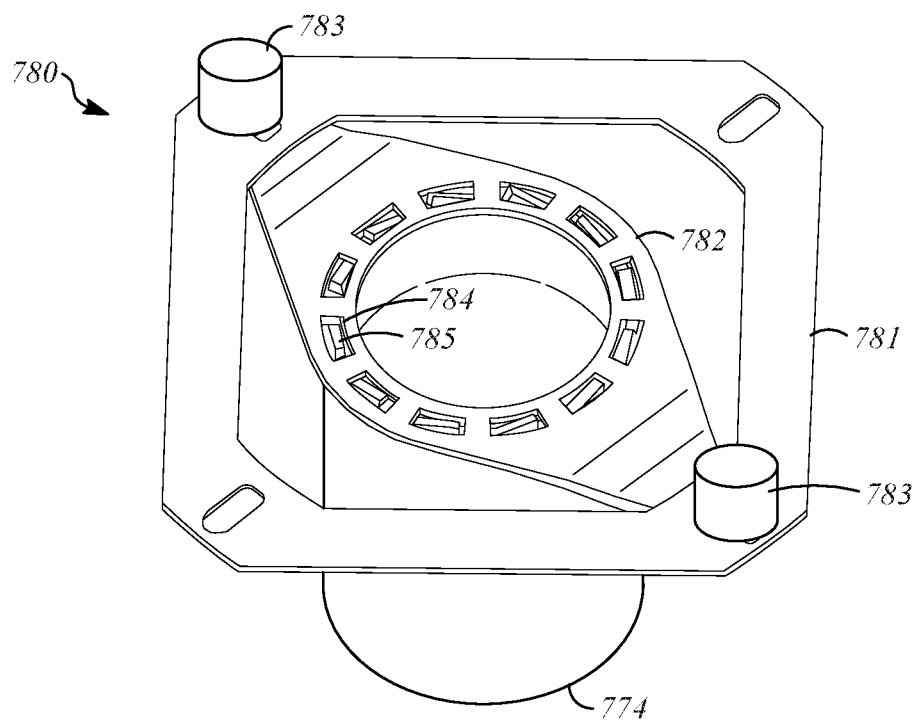
FIG. 7A is a schematic illustration showing a fourth example of a locking structure and a rotational component.
Figure 7B:
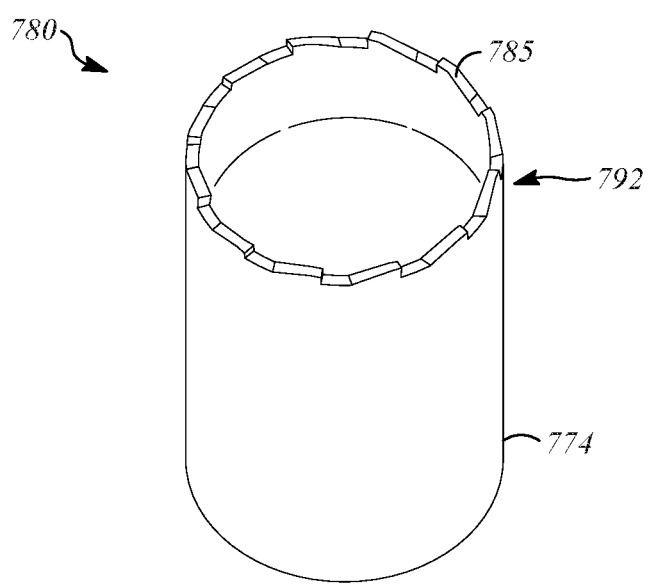
FIG. 7B is a schematic illustration showing the rotational component of FIG. 7A.

FIG. 7A is a schematic illustration showing a locking structure 780 relative to a rotational component 774, and FIG. 7B is a schematic illustration showing an axial end 792 of the rotational component 774. As an example, the rotational component 774 may be the rotor 374 of the ball screw actuator 370, in which case the axial end 792 is the upper axial end of the rotor 374. Alternatively, the rotational component may be the ball nut 372 of the ball screw actuator 370.

The locking structure 780 includes a frame 781 that is fixed to the suspension component 262, such as to the upper housing portion 366. The locking structure 780 includes a restraining plate 782 that is movable relative to the frame 781 toward and away from engagement with the rotational component 774 by actuators 783. The restraining plate 782 is fixed against rotation relative to the frame 781. The actuators 783 may be linear actuators or any or type of actuator that is able to cause motion of the restraining plate 782 relative to the rotational component 774, such as by axial translation or by bending. The restraining plate 782 includes recesses 784, such as depressions, channels, or apertures. The recesses 784 are arranged in a circular pattern complementary to the shape and size of the rotational component 774. The rotational component 774 includes features 785 that are receivable in the recesses 784. As best seen in FIG. 7B, the features 785 are formed on the axial end 792 of the rotational component 774 and may be teeth, projections, tabs, or other structures that can be received in the recesses 784. In a disengaged position, the restraining plate 782 is moved axially away from the rotational component 774 by the actuators 783, such that the features 785 are not disposed in the recesses 784, and the rotational component 774 is not restrained from rotating by the restraining plate 782. In an engaged position, the restraining plate 782 is moved axially toward and into engagement with the rotational component 774 by the actuators 783, such that the features 785 are disposed in the recesses 784, and the rotational component 774 is restrained from rotating by the restraining plate 782.

Figure 8A:
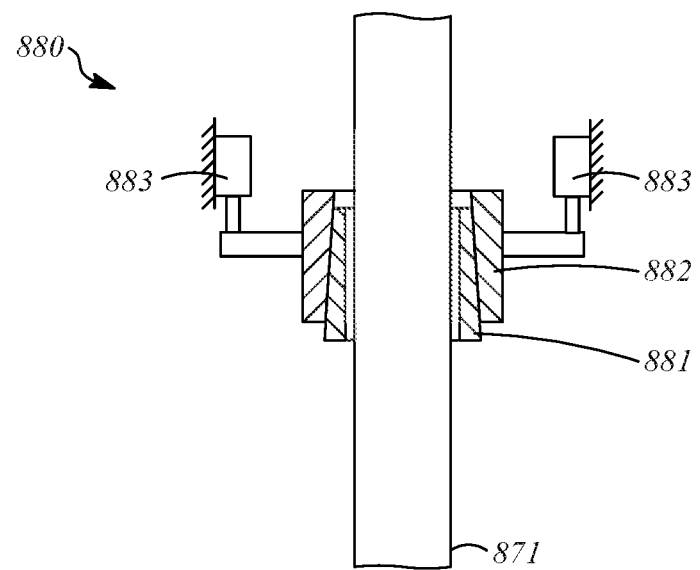
FIG. 8A is a schematic illustration showing a fifth example of a locking structure in a disengaged position relative to a translational component.
Figure 8B:
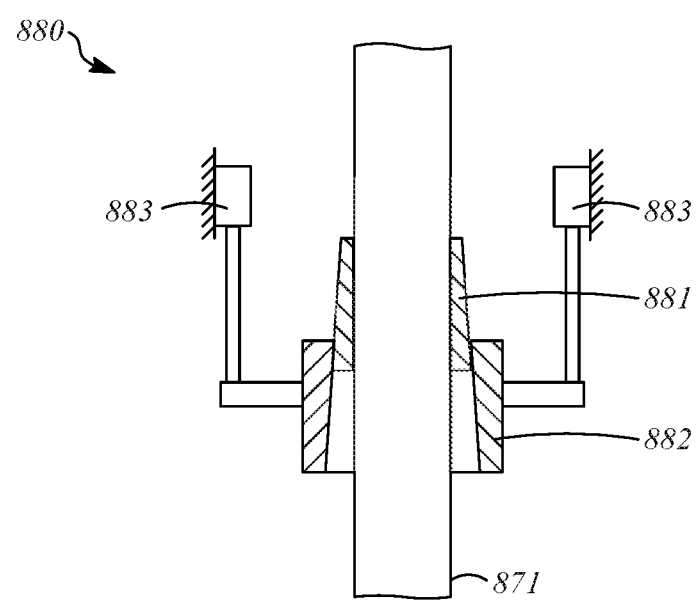
FIG. 8B is a schematic illustration showing the locking structure of FIG. 8A in an engaged position relative to the translational component.

FIGS. 8A-8B are schematic illustrations showing a locking structure 880 in a disengaged position (FIG. 8A), and an engaged position (FIG. 8B) relative to a translational component 871. As an example, the translational component 871 may be the shaft 371 of the ball screw actuator 370. The locking structure 880 includes a clamp defined by an inner collar 881 and an outer collar 882. Actuators 883 are operable to move the outer collar 882 axially. The inner collar 881 has a split-collar structure, and the outer collar 882 engages the inner collar 881 at complementarily tapered surfaces. This configuration causes the inner collar 881 to contract and expand radially in response to axial movement of the outer collar 882 relative to the inner collar 881. In the illustrated example, the inner collar 881 is relaxed in the disengaged position of FIG. 8A. Downward motion of the outer collar 882 in response to movement of the actuators 883 causes the inner collar 881 to contract radially and clamp the translational component 871 in the engaged position of FIG. 8B. Since portions of the locking structure 880 are fixed to the suspension component 262, such as to the upper housing portion 366, translation of the translational component 871 is restrained in the engaged position.

Figure 9A:
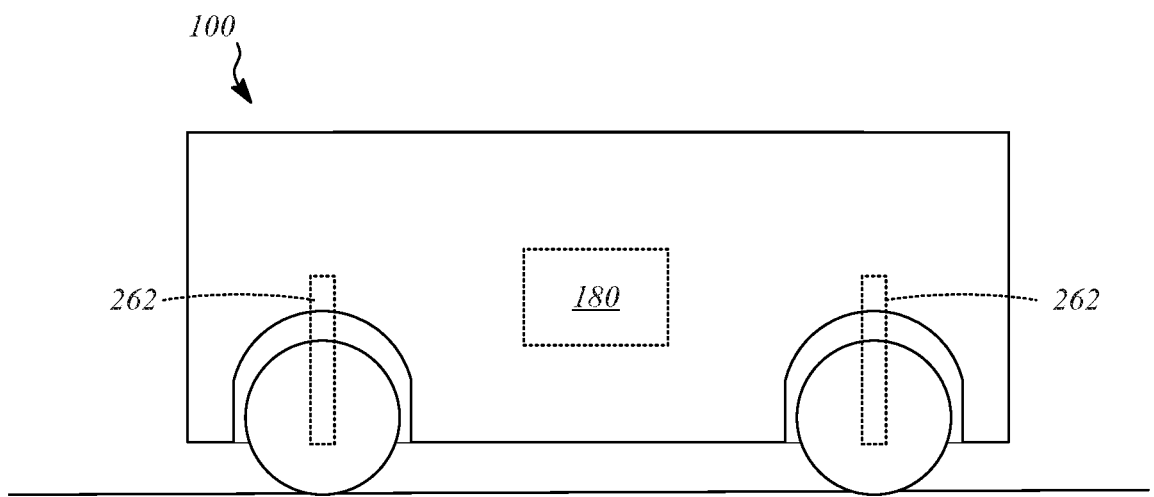
FIG. 9A shows the vehicle in a raised position.
Figure 9B:
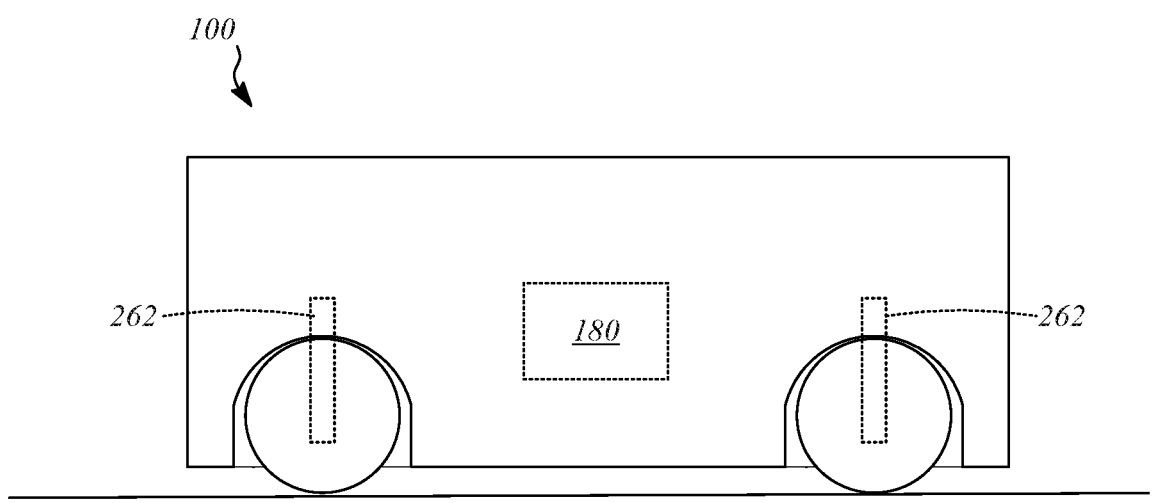
FIG. 9B shows the vehicle in a lowered position.

FIG. 9A shows the vehicle 100 in a raised position, and FIG. 9B shows the vehicle 100 in a lowered position. The vehicle 100 is moved between the raised position and the lowered positions by the suspension components 262. The suspension components 262 may be controlled, for example, by the control system 180. Once the vehicle 100 is moved to the lowered position, the control system 180 engages the locking structures of the suspension components 262 to maintain the lowered position, and the control system 180 deenergizes the suspension components 262 to reduce energy consumption and to reduce heat production. The locking structures maintain the current degree of compression of the suspension components 262 (e.g., including compression of the coil spring 369 of each of the suspension components 262) when supply of electrical power to the suspension components 262 is discontinued. The locking structures are subsequently released by the control system 180 to allow the vehicle 100 to return to the raised position.

Figure 10:
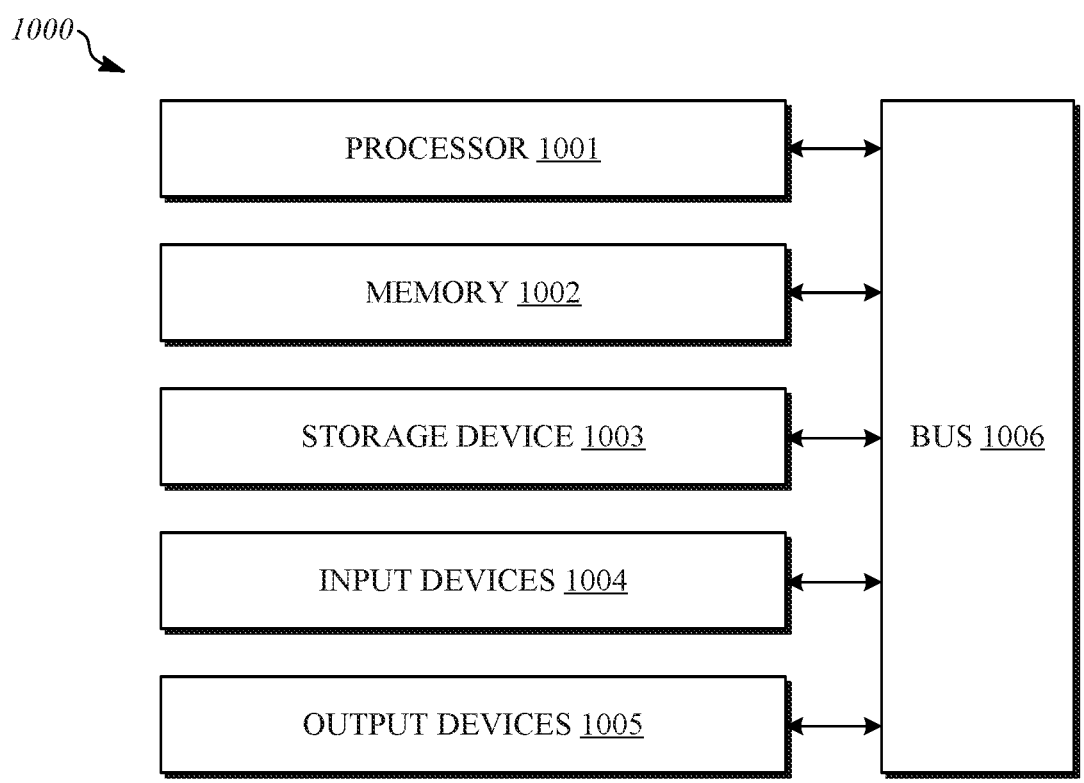
FIG. 10 is a schematic view of a controller.

FIG. 10 is a schematic view of a controller 1000 that may be used to implement the control system 180 and/or other control systems of the vehicle 100. The controller 1000 may include a processor 1001, a memory 1002, a storage device 1003, one or more input devices 1004, and one or more output devices 1005. The controller 1000 may include a bus 1006 or a similar device to interconnect the components for communication. The processor 1001 is operable to execute computer program instructions and perform operations described by the computer program instructions. As an example, the processor 1001 may be a conventional device such as a central processing unit. The memory 1002 may be a volatile, high-speed, short-term information storage device such as a random-access memory module. The storage device 1003 may be a non-volatile information storage device such as a hard drive or a solid-state drive. The input devices 1004 may include any type of human-machine interface such as buttons, switches, a keyboard, a mouse, a touchscreen input device, a gestural input device, or an audio input device. The output devices 1005 may include any type of device operable to provide an indication to a user regarding an operating state, such as a display screen or an audio output, or any other functional output or control.

Figure 11:
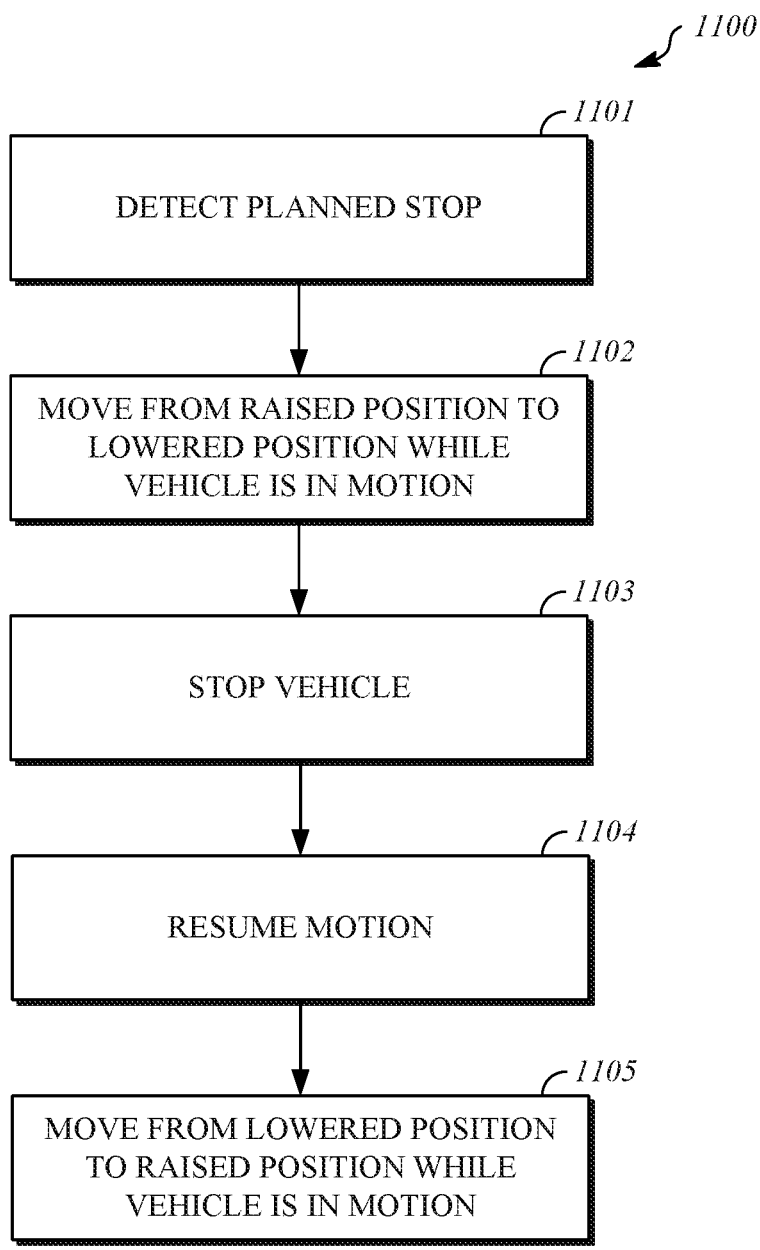
FIG. 11 is a flowchart showing an example of a vehicle control process.

FIG. 11 is a flowchart showing an example of a vehicle control process 1100 that can be performed using the vehicle 100, for example, by execution of computer interpretable program instructions by the control system 180.

Initially the vehicle is in motion and is in a raised position (i.e., at a nominal ride height). In operation 1101, a planned stop is detected, for example, based on information from an autonomous drive system. In operation 1102, the vehicle 100 is moved from the raised position to the lowered position (i.e., the ride height is decreased) by shortening the suspension components 262 under control of the control system 180 in anticipation of the planned stop. In operation 1103, the vehicle 100 is stopped. The lowered position is maintained while the vehicle 100 is stopped, for example, to allow passenger ingress and egress. In operation 1104, motion of the vehicle 100 resumes, for example, under control by the autonomous drive system. In operation 1105, the vehicle is moved from the lowered position to the raised position while the vehicle is in motion.

While the suspension components described herein include a coil spring (e.g., the coil spring 369), the systems and methods described herein can be implemented using other types of suspension springs, such as air springs. In suspension actuators in which the coil springs described previously are replaced with air springs that are pressurized by a compressor and valving system, some or all of the energy used to lower the vehicle could be pneumatic energy supplied by the air springs and/or the compressor. This would reduce the stall torque and thermal loads that are applied to the electromechanical actuator while lowering, holding, and engaging the lock.

In addition, in suspension actuators in which the coil springs described previously are replaced with air springs that include multiple air spring chambers, the air springs can be adjusted to a softest possible air spring stiffness while conducting the lowering and locking procedure. By switching to the largest air volume setting, the spring rate is lowered which significantly lowers the load on the electromechanical actuator during the lowering and locking operation. In some implementations, a very large soft setting air spring volume may be utilized for the lowering and locking procedure and/or for low speed driving use cases where the slow speed actuator excursions are large and therefore produce high losses and heating.

As used in the claims, phrases in the form of "at least one of A, B, or C" should be interpreted to encompass only A, or only B, or only C, or any combination of A, B and C.

What is claimed is:

1. A suspension component, comprising:
   a suspension spring;
   a screw actuator that is operable to compress and decompress the suspension spring upon supply of electrical power to the screw actuator; and
   a locking structure that engages a portion of the screw actuator to restrain motion of the screw actuator to maintain a current degree of compression of the suspension spring.

2. The suspension component of claim 1, further comprising:
   a top mount;
   a bottom mount;
   a housing connected to the top mount;
   and a spring mount connected to the housing,
   wherein the suspension spring extends from the spring mount to the bottom mount,
   wherein the screw actuator includes a rotor, a stator that is operable to rotate the rotor as a result of electromagnetic interaction between the stator and the rotor, a shaft that is connected to the bottom mount, and a ball nut that is connected to the rotor and engages the shaft to linearly translate the shaft in response to rotation of the ball nut.

3. The suspension component of claim 1, wherein the suspension spring extends in an axial direction and the screw actuator extends in the axial direction.

4. The suspension component of claim 1, wherein the screw actuator includes a rotatable component, and the locking structure restrains motion of the screw actuator by engagement with the rotatable component.

5. The suspension component of claim 4, wherein the locking structure includes a pin that is engageable with a recess formed on the rotatable component.

6. The suspension component of claim 4, wherein the locking structure includes a pawl that is engageable with a feature formed on the rotatable component.

7. The suspension component of claim 4, wherein the locking structure includes a restraining collar that is engageable with features that are formed on an outer surface of the rotatable component.

8. The suspension component of claim 4, wherein the locking structure includes a restraining plate that has recesses that are engageable with features formed on an axial end of the rotatable component.

9. The suspension component of claim 4, wherein the rotatable component is a rotor of the screw actuator.

10. The suspension component of claim 4, wherein the screw actuator includes a shaft and a nut, wherein the rotatable component is the nut.

11. The suspension component of claim 4, wherein the screw actuator is a ball screw actuator.

12. The suspension component of claim 4, wherein the screw actuator is a lead screw actuator.

13. The suspension component of claim 4, wherein the locking structure is operable to maintain the current degree of compression of the suspension spring when supply of electrical power to the screw actuator is discontinued.

14. A suspension component, comprising:
   suspension spring;
   a screw actuator that is operable to compress and decompress the suspension spring upon supply of electrical power to the screw actuator, wherein the screw actuator includes a rotatable component and a shaft; and
   a locking structure that is movable between a disengaged position in which the locking structure does not restrain motion of the rotatable component of the screw actuator, and an engaged position in which the locking structure restrains motion of the rotatable component of the screw actuator to maintain a current degree of compression of the suspension spring.

15. The suspension component of claim 14, wherein the locking structure restrains motion of the screw actuator by engagement with features that are formed on an axial end of the rotatable component.

16. The suspension component of claim 14, wherein the locking structure is operable to maintain the current degree of compression of the suspension spring when supply of electrical power to the screw actuator is discontinued.

17. The suspension component of claim 14, further comprising:
   a top mount;
   a bottom mount;
   a housing connected to the top mount; and
   a spring mount connected to the housing,
   wherein the suspension spring extends from the spring mount to the bottom mount, and
   wherein the shaft of the screw actuator is connected to the bottom mount to move the bottom mount relative to the top mount in response to translation of the shaft by the screw actuator.

18. A suspension component, comprising:
   a top mount;
   a bottom mount;
   a housing connected to the top mount;
   a spring mount connected to the housing;
   a suspension spring that extends from the spring mount to the bottom mount;
   a screw actuator that includes a rotor, a stator that is operable to rotate the rotor as a result of electromagnetic interaction between the stator and the rotor, a shaft that is connected to the bottom mount, and a ball nut that is connected to the rotor and engages the shaft to linearly translate the shaft in response to rotation of the ball nut, and is operable to compress and decompress the suspension spring upon supply of electrical power to the screw actuator; and a locking structure that restrains rotation of the rotor of the screw actuator in an engaged position and does not restrain rotation of the rotor of the screw actuator in a disengaged position, wherein the locking structure is configured to maintain a current degree of compression of the suspension spring in the engaged position.

19. The suspension component of claim 18, wherein the locking structure restrains rotation of the rotor of the screw actuator by engagement with a rotatable component of the screw actuator that is connected to the rotor.

20. The suspension component of claim 19, wherein the locking structure includes a restraining plate that has recesses that are engageable with features formed on an axial end of the rotatable component.

21. The suspension component of claim 18, wherein the locking structure is operable to maintain the current degree of compression of the suspension spring when supply of electrical power to the screw actuator is discontinued.

\* \* \* \* \*